(12) United States Patent
Adamson

(10) Patent No.: US 11,383,806 B2
(45) Date of Patent: Jul. 12, 2022

(54) SUPPORTING SATURATION DIVERS UNDERWATER

(71) Applicant: Subsea 7 Limited, Sutton (GB)

(72) Inventor: Ian Adamson, Aberdeen (GB)

(73) Assignee: Subsea 7 Limited, Sutton (GB)

( * ) Notice: Subject to any disclaimer, the term of this patent is extended or adjusted under 35 U.S.C. 154(b) by 591 days.

(21) Appl. No.: 16/472,186

(22) PCT Filed: Dec. 19, 2017

(86) PCT No.: PCT/GB2017/053813
§ 371 (c)(1),
(2) Date: Jun. 20, 2019

(87) PCT Pub. No.: WO2018/115850
PCT Pub. Date: Jun. 28, 2018

(65) Prior Publication Data
US 2019/0351985 A1    Nov. 21, 2019

(30) Foreign Application Priority Data

Dec. 21, 2016 (GB) ...................................... 1621888

(51) Int. Cl.
*B63C 11/26* (2006.01)
*B63C 11/52* (2006.01)
(Continued)

(52) U.S. Cl.
CPC .............. *B63C 11/26* (2013.01); *B63C 11/52* (2013.01); *B63G 8/001* (2013.01); *G06F 3/0346* (2013.01);
(Continued)

(58) Field of Classification Search
CPC ......... B63C 11/26; B63C 11/52; B63C 11/48; B63C 2011/021; B63G 8/001;
(Continued)

(56) References Cited

U.S. PATENT DOCUMENTS

| 5,079,753 A | 1/1992 | Suggs |
| 9,060,102 B2 | 6/2015 | Cook |

(Continued)

FOREIGN PATENT DOCUMENTS

| CN | 104752890 | 7/2015 |
| EP | 0 009 856 | 4/1980 |

(Continued)

*Primary Examiner* — Anthony D Wiest
(74) *Attorney, Agent, or Firm* — Levy & Grandinetti

(57) ABSTRACT

A subsea assistance system for supporting saturation diver operations includes an unmanned underwater vehicle (UUV) such as an observation remotely operated underwater vehicle (ROV) that can be flown to a subsea worksite, and various items of ancillary electrical equipment that are connected or subsea-connectable to the UUV or to a skid forming part of the UUV. Those items can include any of: a hand-portable subsea display that displays an image to a diver communicated from the UUV, which image can be generated or enhanced underwater and/or by surface support; a subsea camera that captures subsea image data for communication to the UUV and from the UUV to surface support; and a selection of electrical power tools for performing subsea tasks. Fast-acting protective devices protect divers when using high-voltage wet-mateable subsea connectors on the UUV.

23 Claims, 10 Drawing Sheets

(51) Int. Cl.
  *B63G 8/00* (2006.01)
  *G06F 3/0346* (2013.01)
  *G06T 19/00* (2011.01)
  *H04N 5/225* (2006.01)

(52) U.S. Cl.
  CPC ......... *G06T 19/006* (2013.01); *H04N 5/2253* (2013.01); *B63G 2008/002* (2013.01); *G06T 2200/24* (2013.01)

(58) Field of Classification Search
  CPC ............ B63G 2008/002; G06F 3/0346; G06T 19/006; G06T 2200/24; H04N 5/2253
  USPC ........................................................ 114/312
  See application file for complete search history.

(56) References Cited

U.S. PATENT DOCUMENTS

| | | |
|---|---|---|
| 2003/0153468 A1 | 8/2003 | Soelvik |
| 2010/0302233 A1 | 12/2010 | Holland |
| 2013/0258751 A1 | 10/2013 | Hagan |
| 2016/0061878 A1 | 3/2016 | Hazel |

FOREIGN PATENT DOCUMENTS

| | | |
|---|---|---|
| EP | 0 345 718 | 12/1989 |
| FR | 2 988 370 | 9/2013 |
| GB | 2 106 372 | 4/1983 |
| WO | WO 03/097446 | 11/2003 |
| WO | WO 2010/066292 | 6/2010 |
| WO | WO 2010/099371 | 9/2010 |
| WO | WO 2015/196234 | 12/2015 |
| WO | WO 2016/124850 | 8/2016 |

SUPPORTING SATURATION DIVERS UNDERWATER

This invention relates to the challenges of performing tasks underwater using saturation divers.

Saturation divers are often used to work on subsea equipment and installations, most often in the subsea oil and gas industry, wherever the water is shallow enough. Of course, 'shallow' is a relative term: it is common for such divers to work at depths of between 100 m and 200 m, and sometimes more.

Saturation divers return between dives to a closed diving bell that shuttles to and from a dry pressurised habitat. The divers may live under high gas pressure for days, or even weeks, in that habitat before undergoing slow decompression at the end of a working period. That working period may involve numerous dives and hence transits in the diving bell between the habitat and one or more subsea worksites.

It is self-evident that saturation divers work in an intrinsically hazardous environment. So, it is essential to maximise their safety throughout and to minimise their exposure to danger. This is best achieved by simplifying their underwater operations and by reducing the time that they must spend in the diving bell or on each dive. Simplifying operations and reducing time spent underwater also has the benefit of minimising the considerable cost of deploying divers. For example, the typical cost of a surface support vessel alone far exceeds US$5000 per hour.

Saturation divers cannot return quickly to ambient surface pressure during a working period and must therefore be given the necessary support underwater while performing subsea tasks. Aside from life support, a diver requires the provision of information relating to a task—for example verbal, written or diagrammatic instructions—and the provision of such tools as may be necessary to perform that task. A diver may also need help to perceive the subsea environment, especially where visibility is poor. A diver also needs to convey verbal and visual information to other divers helping to perform the task, and to a support team in dive control at the surface.

In terms of information, the state of the art is for saturation divers to rely upon verbal communication with dive supervisors during a dive. This may be supplemented by laminated paper instructions if written or diagrammatic information relating to a task is required to be viewed at a subsea worksite. Helmet-mounted displays have been proposed to convey visual information to a diver but these only present restricted information and have had limited success. For example, in U.S. Pat. No. 5,079,753, a submerged sonar system provides a signal that is processed and displayed on a submerged monitor mounted on a diver's helmet to provide the diver with a view of the subsea environment.

Divers may also capture a video feed to be sent to the surface to provide visual information that supplements verbal information concerning the task in hand. For example, a video camera may be suspended from the surface on a downline and manipulated by the diver to show a particular feature. This is inconvenient, complicates a subsea operation and introduces a hazard.

It is also well known to use helmet-mounted cameras. However such cameras can only show what the orientation of the diver's head allows. Also, they are bulky, which introduces another hazard. For example, such cameras may require time-consuming removal from the helmet for the diver to get into difficult-to-reach places.

In terms of tools, saturation divers commonly use manual hand tools, such as wire brushes or scrapers that are used to clean marine growth and debris from a subsea structure. Such tools may be lowered with the diving bell or in a separately-lowered diver work basket.

More challenging tasks may be performed using high-power hydraulic power tools that are suspended and powered from the surface by a downline. Again, suspending tools or providing them in a work basket complicates subsea operations and introduces a hazard. In particular, hydraulic hoses tend to be stiff, heavy and difficult to manage underwater. Hydraulic systems also present the environmental risk of accidental leakage of hydraulic fluid. Pneumatic systems can also be used to power subsea tools through downlines but they also present challenges of safety and convenience.

In view of these challenges, commercial diving operators are developing remotely-operated support systems for saturation divers. Conventionally, remote operations underwater involve the use of unmanned underwater vehicles or UUVs. UUVs are classified into work UUVs and observation UUVs, also known as inspection UUVs.

The high power required for actuating mechanised tools and robotic arms means that work UUVs are nearly always tethered to a surface support vessel by an umbilical that transmits data and supplies power. The use of an umbilical tether characterises such UUVs as remotely operated vehicles or ROVs. They are bulky machines, one example being 3 m long. In view of their size and power, work UUVs are rarely used at the same subsea location as divers because their proximity to divers is considered to present a hazard. Consequently, the main use of work UUVs is as a replacement for divers, especially in water depths of more than 300 m where divers cannot operate effectively.

Observation UUVs can be ROVs or AUVs (autonomous underwater vehicles), the latter being characterised by being able to operate without being tethered continuously to a surface support vessel. Observation UUVs are smaller and less powerful than work UUVs and are known in the art to support divers underwater. For example, ECA Group offers ROVs for assistance to divers, these being observation ROVs adapted to support lights and cameras, and to support a basket for transporting items such as hand tools between the surface and a subsea worksite. Also, U.S. Pat. No. 9,060,102 teaches that a diver can handle a camera mounted on an ROV to transmit images to a surface support team. Those images can only be viewed, interpreted and acted on by the support team at the surface.

It is possible for an ROV to carry a skid that adapts the ROV for a particular purpose, such as to provide power to other apparatus underwater or to carry tools. Transporting items such as tools in a basket or a skid and handling them underwater to connect them to subsea power ports is known in the art. For example, WO 03/097446 discloses subsea change-over of hydraulically powered tools.

FR 2988370 describes a hand-held device for underwater use near the water surface; this device is unsuitable for use by saturation divers due to the high pressures the device would be subject to at such depths. EP 0009856 describes an underwater investigation system comprising a handheld device connected to a UUV that is controlled from within by an operator.

In general, as hydraulic hoses may be connected safely underwater, tools known by those skilled in the art to be plugged into or unplugged from power supplies underwater are generally powered hydraulically. However, more and more UUVs, and especially observation UUVs, are powered electrically. This presents a problem because it is challenging to maintain safety while making and breaking high-voltage electrical connections underwater. So, in the art, subsea electric tooling is typically powered by downlines connected directly to a surface support vessel. As noted above, suspending tools in this way complicates subsea operations and introduces a hazard.

WO 2015196234 relates to a support buoy comprising a generator unit and an umbilical arranged to provide services (e.g. electrical supply) to subsea equipment GB 2106372 describes a circuit breaker for use in diver equipment and CN 104752890 relates to a wet-mateable connector for underwater equipment.

The present invention proposes improvements to observation UUVs to provide better support to saturation divers and better integration between that support and the divers themselves.

Against this background, the invention provides a subsea assistance system for saturation divers, the system comprising: a UUV; and items of ancillary electrical equipment that are connected or subsea-connectable to the UUV, those items comprising at least one subsea display arranged to display to a diver, subsea, an image corresponding to image data communicated to the display from the UUV.

The display is advantageously diver-transportable away from the UUV to a subsea location remote from the UUV while remaining connected to the UUV by a display data link. For example, the display data link may be implemented by a cable extendable from the UUV, which cable also conveys electrical power to the display.

The display is suitably a hand-portable subsea tablet. In that case, the UUV may comprise a pivot mounting for the tablet on which the tablet, when mounted, is pivotably movable relative to the UUV.

The tablet preferably comprises a locating device that is capable of determining the subsea location of the tablet. The tablet may further comprise a navigation system that is responsive to the location of the tablet and that is arranged to display corresponding navigation information on the tablet. The tablet may also comprise a compass that is capable of determining the subsea heading of the tablet.

The system may further comprise a memory storing data that characterises a subsea worksite, wherein the system is arranged to retrieve stored image data from the memory corresponding to the location and heading of the tablet when in the worksite and to display on the tablet an image corresponding to that stored image data. The tablet may also comprise an accelerometer device capable of determining 3D orientation or movement of the tablet.

Preferably, the system of the invention further comprises an augmented reality engine for overlaying augmented reality images onto an image displayed on the display. The system of the invention may also comprise a live sketch engine for overlaying live sketch images onto an image displayed on the display.

The UUV is suitably arranged to process data signals incoming from surface support and to separate those signals into UUV control signals and data signals for transmission to the ancillary equipment. The UUV may have a data link to surface support and may be arranged to convey image data to the display, communicated along the data link from the surface support.

In preferred embodiments, the ancillary equipment further comprises at least one subsea camera arranged to capture image data, subsea, for communication to the UUV. In that case, the system is preferably arranged to integrate image data captured by the camera into image data for display on the display. The system may further comprise an image enhancement engine for enhancing image data captured by the camera before displaying a corresponding image on the display.

Like the display, the camera is preferably diver-transportable away from the UUV to a subsea location remote from the UUV while remaining connected to the UUV by a camera data link. In that case, the camera data link may be implemented by a cable extendable from the UUV, which cable also conveys electrical power to the camera.

The ancillary equipment may further comprise at least one subsea electrical tool that is connected or connectable to the UUV via a cable. In this respect, the UUV suitably comprises at least one wet-mateable electrical connector to which a cable for conveying electrical power to a respective item of ancillary equipment is diver-connectable subsea. At least one of those connectors is preferably protected by a protective device that is arranged to trip a circuit breaker in 20 ms or less. The or each connector protected by the protective device is suitably supplied by a power circuit that is capable of operating at a voltage of up to 250V DC or 220V AC.

The invention may therefore also be expressed as a subsea assistance system for saturation divers, the system comprising: a UUV having at least one wet-mateable electrical connector to which a cable for conveying electrical power to ancillary equipment is diver-connectable subsea, the or each of said connectors being protected by a protective device that is arranged to trip a circuit breaker and at least one item of ancillary equipment being a subsea electrical tool that is subsea-connectable to the UUV via a cable that can be wet-mated to a respective one of the connectors.

As above, the protective device is preferably arranged to trip the circuit breaker in 20 ms or less and the or each connector is preferably supplied by a power circuit capable of operating at a voltage of up to 250V DC or 220V AC.

The subsea electrical tool may be selected from: a grinder; a drill; a vibrating scraper; a modular rotary tool with interchangeable heads or fittings; a saw; an ultrasonic or cathodic protection testing meter or a torque tool.

The UUV conveniently comprises a skid to which at least one of said items of ancillary equipment is connected or is subsea-connectable. Also, the UUV may comprise at least one onboard stowage space for at least one of said items of ancillary equipment.

For redundancy, a bidirectional diver-to-surface audio communication system may advantageously be routed through the UUV.

The UUV may be an observation ROV and may be powered electrically. In accordance with the invention, a UUV may support more than one diver.

The inventive concept also embraces a corresponding method of supporting saturation diver operations. That method comprises: flying a UUV to a subsea worksite; and communicating image data from the UUV to at least one diver at the worksite who views at least one subsea display that is connected to the UUV by a data link.

Advantageously, the UUV carries a subsea display to the worksite and a diver carries the subsea display away from the UUV to a subsea location remote from the UUV while the subsea display maintains image data communication with the UUV. For example, the diver may carry and view the subsea display as a hand-portable subsea tablet.

The method of the invention preferably comprises determining the subsea location of the subsea display. In that case, navigation information may be displayed to the diver on the subsea display corresponding to that subsea location.

It is also possible to determine the subsea heading of the subsea display and/or 3D orientation or movement of the subsea display.

Image data may be retrieved in accordance with the location and heading of the subsea display from a store of such data that characterises the worksite. An image may then be displayed on the subsea display corresponding to the retrieved image data.

Advantageously, augmented reality images or live sketch images may be overlaid onto an image displayed on the subsea display.

Image data is preferably captured at the worksite and communicated to the UUV. For example, the captured image data may be conveyed from the UUV to the or each subsea display. The captured image data may be enhanced before displaying a corresponding image on the subsea display. Image data captured at the worksite may be integrated with image data received from surface support.

Image data may be captured at the worksite using a camera at a subsea location remote from the UUV while maintaining image data communication between the camera and the UUV. Image data may be communicated from surface support to the UUV before communicating that image data from the UUV to the or each subsea display. In that case, the UUV may process data signals incoming from surface support and separate those signals into UUV control signals and image data signals for transmission to the or each subsea display.

In practising the invention, a diver preferably connects at least one item of ancillary equipment to the UUV when underwater via a wet-mateable electric connector. Such an item of diver-connected ancillary equipment may be a subsea display, a camera or a subsea electrical tool.

The invention may also be expressed as a method of supporting saturation diver operations, the method comprising: flying a UUV to a subsea worksite, at which a diver connects a subsea electrical tool to a power source on the UUV via a wet-mateable electric connector; and protecting the diver and the integrity of the power source by tripping a circuit breaker associated with the connector in the event of a fault, preferably in 20 ms or less. In that case, the connector may be supplied with electrical power at a voltage of up to 250V DC or 220V AC.

The functionality of the invention can be implemented in a skid coupled to a standard ROV or other UUV. This allows the skid to be removed when it is no longer needed and the UUV is required for other tasks, whereupon a skid with different functionality could be used instead. Alternatively, the functionality of the invention could be integrated into a bespoke ROV or other UUV. So, unless the context requires otherwise, a UUV having the functionality of the invention may be regarded as being synonymous with a UUV fitted with a skid that adds that functionality to the UUV. Thus, a skid may be regarded as being part of a UUV of the invention unless the context requires otherwise.

One aspect of the invention is to provide visual assistance to saturation divers. A camera of the ROV and/or an additional camera mounted on or connected to the skid by a wired or wireless data connection captures images, as is known in the art. The images are transmitted by a wired or wireless data connection to a subsea screen that can be viewed by a diver. For this purpose, the subsea screen may be mounted by hinges onto the skid or the diver can grab the subsea screen and take it off the skid to be held like a tablet. The image signal may then be transmitted from the skid to the subsea screen by known means such as radio-frequency signals or a wire.

Image data can be processed in real-time to integrate information into the image displayed on the subsea screen, for example water depth or work instructions. Other examples are a 3D model of the subsea worksite when the picture is not clear enough due to poor visibility, magnification of the view, or augmented-reality images. The image data could be processed in various locations, for example by a processor in the skid, or in the ROV, or in the subsea screen, or in a computer system hosted by a surface support vessel.

Embodiments of the invention provide a system for assistance to saturation divers, the system comprising: a UUV; at least one subsea camera; at least one storage space for tools wherein the storage space is accessible to divers; and at least one display wherein the display can be made visible to a diver. Communicating with divers verbally can take up a lot of time and can still lead to misunderstandings. A display that can supplement verbal communication by providing real-time visual information to divers can save valuable time and ensure accuracy.

Embodiments of the invention also provide a system for assistance to saturation divers, the system comprising: a UUV; at least one storage space for tools wherein the storage space is accessible to divers; and at least one electric plug or socket for underwater connection of hand-held electric tools. The electric plugs or sockets are suitably wet-mateable and may be powered from at least one fast-tripping AC or DC electrical switchboard located in the skid. Such a fast-tripping switchboard is particularly advantageous in the context of hand-held electric tools due to the amount of electrical power and the associated high voltages that are required to power such electric tools.

The UUV is preferably an observation ROV. At least one of the storage space, the electric plugs and the display may be provided by an add-on structure that is removably connected to the UUV. For example, the add-on structure may be a skid that is mechanically and electrically connected to the UUV.

The camera may be a camera of the UUV or may be mounted on the add-on structure. The camera may be stored in the storage space.

The display may be removable from the UUV or the add-on structure and is preferably a tablet enclosed for subsea use. The display suitably shows image data captured by the camera and may simultaneously show additional metadata such as water depth, a 3D-model, a compass or work instructions, any of which may be superimposed onto or shown beside the image data captured by the camera.

The system of the invention may comprise a communication device that allows bidirectional transfer of audio signals between the system and at least one diver. For example, audio signals may be exchanged between the skid and a surface support vessel through a connection of the skid to the UUV and an umbilical that links the UUV and the surface support vessel.

One UUV may support more than one diver. Conversely, one diver may be supported by more than one UUV.

More specifically, preferred embodiments of the invention provide a diver communications and power skid for an observation ROV. However, as noted above, similar functionality could be incorporated into an ROV or other UUV designed in accordance with the invention. The skid has connectors built in, which divers can plug into underwater using wet-mateable electrical connectors to provide power for hand tools or other electrical equipment and/or communications both to and from the surface. A pod in the skid suitably carries all necessary power conversion and communications electronics as well as diver safety circuits.

The skid may have a tray or other receptacle that stores a camera on a lead for survey and a subsea screen that is connected via the ROV to a computer or laptop in dive control to provide visual information to one or more divers. Among many possible visuals, the subsea screen could, for example, provide: a navigation display to show divers their position at a worksite and where they need to go next; photographic images; videos including live footage from another diver or the ROV; other camera feeds; procedures for the job or for a particular tool being used; live sketches; instructions; layouts of the subsea equipment being worked on; or an augmented-reality view by 3D image superimposition.

In use, the ROV of the invention flies to one or more divers at a subsea worksite. A diver removes the screen from the skid and communicates with dive control to receive information concerning the task to be performed at the worksite. The screen may then be returned to the skid and the task continued, or the screen may continue to be held for monitoring purposes as the task progresses.

Electrical hand tools or powered implements such as grinders, scrapers, drills, testing equipment or any other electrical equipment up to 250V DC or 220V AC may be linked back to the ROV using cables fitted with standard diver-mateable connections. These tools may be sent down to the worksite in a diver work basket, mated to the ROV via the skid at the worksite when required and then removed after use and returned to the basket. However, there may be space on the ROV or the skid to carry some such tools underwater to the worksite instead.

Thus, the invention involves a subsea assistance system for supporting saturation diver operations. A UUV such as an observation ROV can be flown to a subsea worksite, and various items of ancillary electrical equipment are connected or subsea-connectable to the UUV or to a skid forming part of the UUV. Those items may comprise any of: a hand-portable subsea display that displays an image to a diver communicated from the UUV, which image may be generated or enhanced underwater and/or by surface support; a subsea camera that captures subsea image data for communication to the UUV and from the UUV to surface support; and a selection of electrical power tools for performing subsea tasks. Fast-acting protective devices protect divers when using high-voltage wet-mateable subsea connectors on the UUV.

The invention increases the efficiency of communication between divers and dive supervisors by providing visual aids to divers. Dive supervisors and project engineers benefit from divers capturing images from difficult-to-reach places, which can be relayed quickly to dive control, substantially in real-time. The invention also reduces the reliance on manual hand tools and large hydraulic hand tools by providing divers with the ability quickly to use mid-power electrical hand tools. This makes subsea tasks easier and quicker, and also improves environmental impact.

In order that the invention may be more readily understood, reference will now be made, by way of example, to the accompanying drawings, in which.

Figure 1:
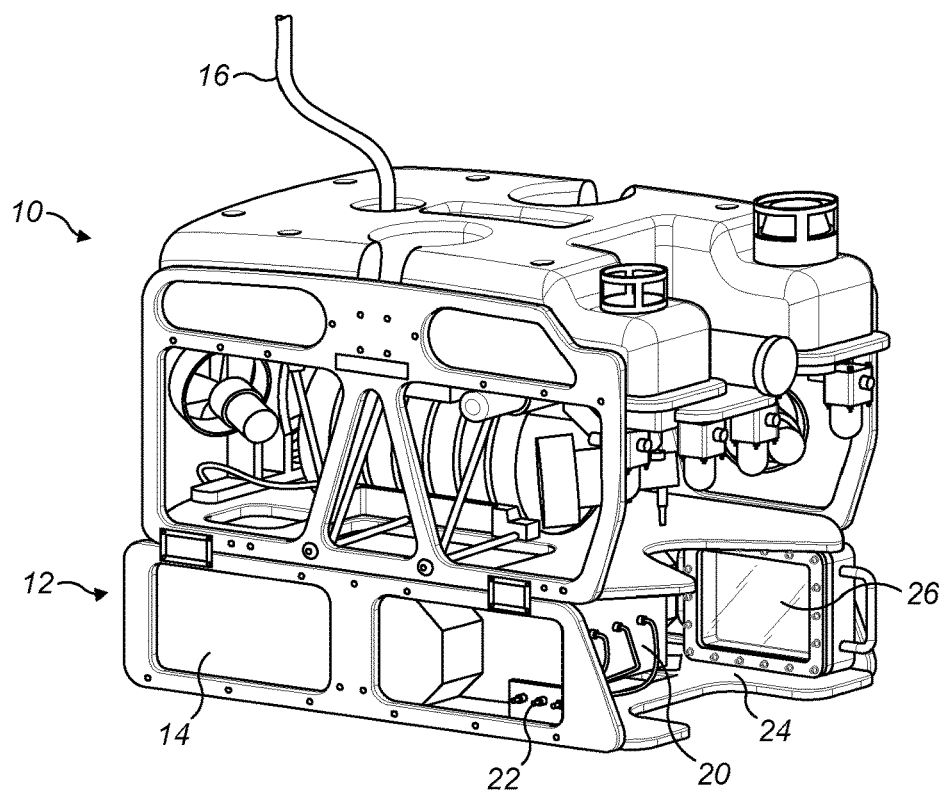
FIG. 1 is a perspective view of an observation ROV fitted with a skid adapted in accordance with the invention.
Figure 2:
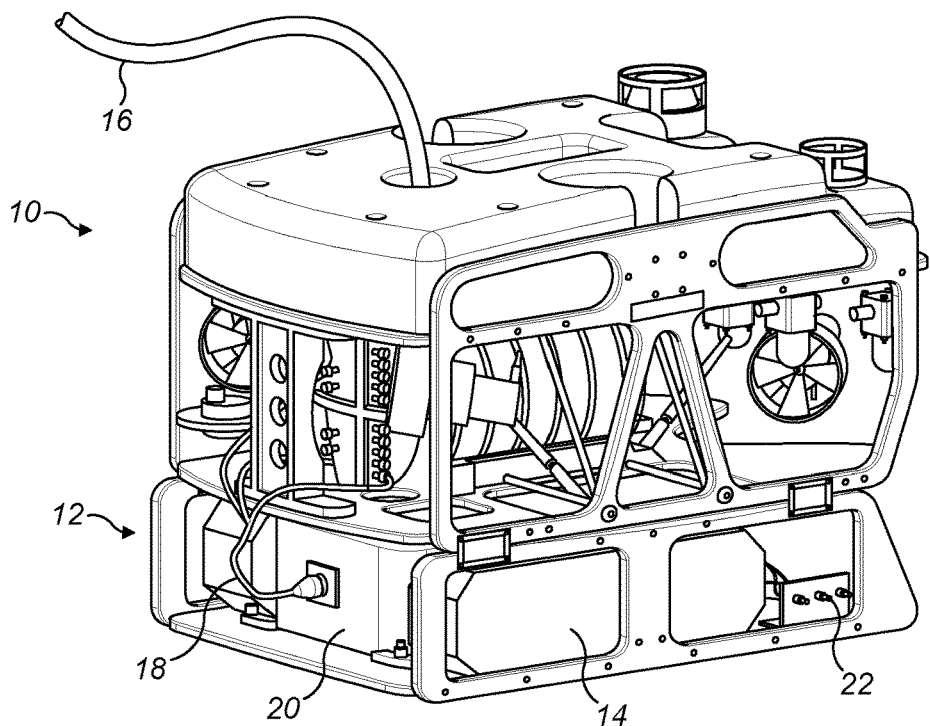
FIG. 2 is a rear perspective view of the observation ROV shown in FIG. 1.

Referring firstly to FIGS. 1 and 2 of the drawings, these show an observation ROV 10 that has been adapted in accordance with the invention by the attachment of a skid 12 to its underside. Buoyancy 14 is provided on the skid 12 so that the ROV 10 remains neutrally buoyant when fitted with the skid 12.

An umbilical 16 links the ROV 10 to the surface to receive electrical power and for data communications, either directly or indirectly via a tether management system. The skid 12 interfaces functionally with the ROV 10 through a data and power cable 18 that connects communications and power systems of the ROV 10 to corresponding systems in a sealed pod 20 in the skid 12.

The pod 20 houses electronics and power circuitry to enable the necessary interfaces with the ROV 10 and with additional equipment that may be connected to the skid 12.

For example, the pod 20 may implement AC/DC conversion; safety trip circuits; fibre-optic signal conversion and splicing; and outputs to an array of diver-mateable connectors 22 to which saturation divers can connect additional equipment underwater as will be described below.

Several technologies for underwater electrical connectors are known in the art, for instance induction connectors that allow power and data transfer without risking contact of seawater with conductors. This is to be distinguished from the circuit-breaker/wet-mateable connectors disclosed in various documents that have been acknowledged specifically as prior art in the introduction.

The pod 20 is preferably oil-filled and pressure-compensated to counteract hydrostatic pressure at depth. Also, because of hydrostatic pressure, marinisation of cables may be required, for example by using oil-filled cables and connectors.

Different output and input connectors 22 are provided on the skid 12 for different purposes, for example to provide electrical power, communications and feedback to and from the surface. However, whilst plug-in connectors 22 are preferred for adaptability, it is possible for at least some of the additional equipment to be hard-wired to the skid 12 or to the ROV 10 without using plug-in connectors 22.

The skid 12 may provide stowage space 24 for one or more items of additional equipment. In this example, the skid 12 provides stowage space for a display unit 26 and for an extensible cable 28 (seen in FIG. 4) that carries power and data between the skid 12 and the display unit 26. In this way, the ROV 10 can carry the display unit 26 to one or more divers at a subsea worksite so that the or each diver can interact with and operate the display unit 26. As will be explained later, there are many instances where a diver would benefit from having a display unit 26 at the worksite to display information of assistance to the task in hand.

Figure 3:
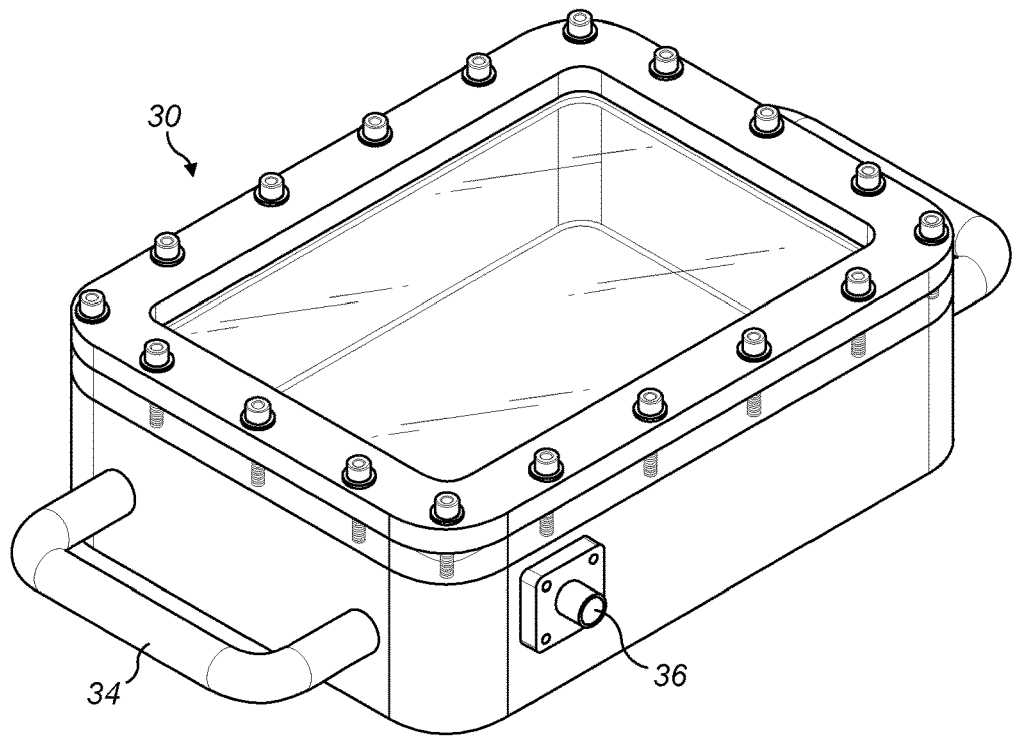
FIG. 3 is a perspective view of a housing for a video display unit that can be mounted on and dismounted from the observation ROV shown in FIGS. 1 and 2.
Figure 4:
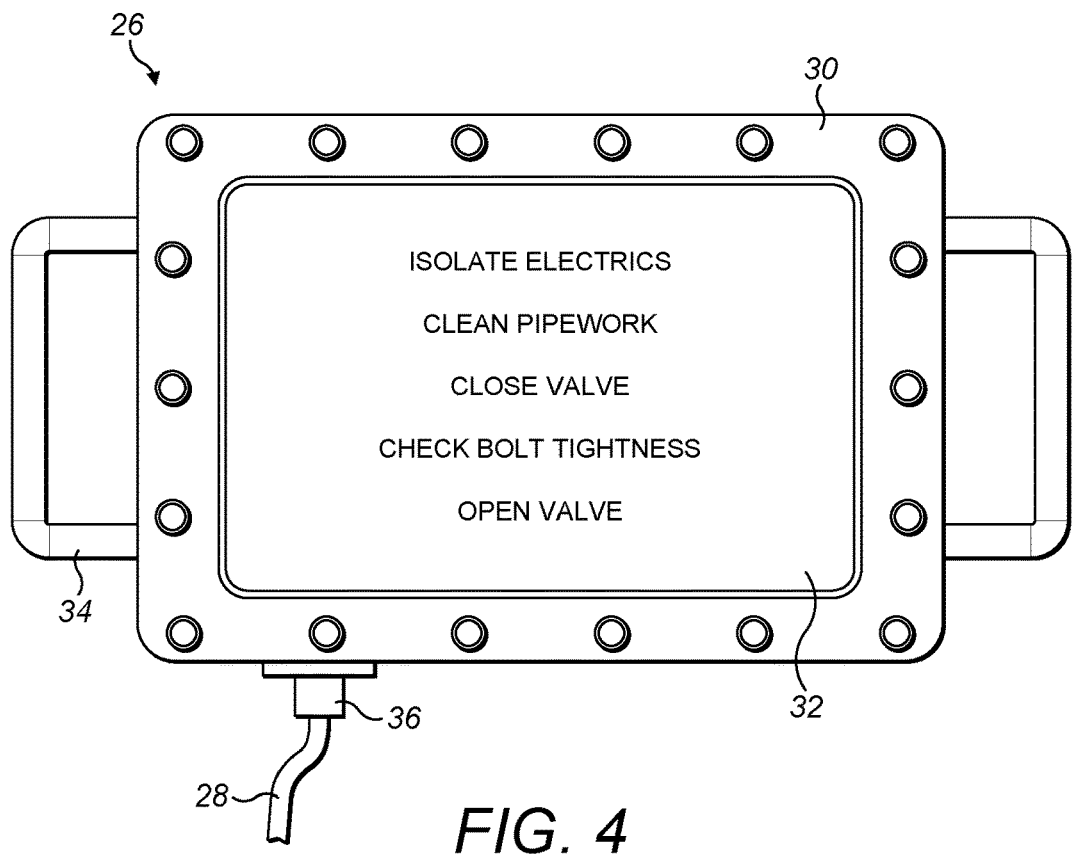
FIG. 4 is a schematic front view of a display unit comprising a screen protected in the housing of FIG. 3, the screen being in a first display mode.

FIG. 3 shows a housing 30 of the display unit 26, being a subsea container for a display screen 32 as shown in FIG. 4. FIG. 4 shows the screen 32 within the housing 30 and an example of an image displayed on the screen 32. In this example, the image conveys a simple set of text instructions relating to a task to be performed.

The housing 30 is a sealed, hollow, generally cuboidal, pressure-resistant enclosure of steel or aluminium with a sapphire glass panel on its front face, through which the diver can view the screen 32 within. The housing 30 also has handles 34 on its side faces that the diver may grasp easily while wearing thick gloves. The housing 30 is suitably air-filled and may have a partial vacuum pulled within it. When fitted with a display screen 32 in the housing 30, the display unit 26 is preferably neutrally buoyant or slightly negatively buoyant so as to be easy for a diver to hold underwater and to control without exertion.

A bulkhead connector or penetrator 36 in a bottom wall of the housing 30 provides for the screen 32 within to be connected to the cable 28 that extends from the skid 12. The cable 28 thereby penetrates the wall of the housing 30 to link the screen 32 to the skid 12, and from there via the ROV 10 and the umbilical 16 to computer systems in dive control on the surface support vessel.

The screen 32 preferably has embedded PC functionality, thus being a tablet computer although with no need of touch-screen input capability. The screen 32 is suitably controlled via an Ethernet-type connection from the skid 12, which also supplies power to the screen 32 through the cable 28. Ethernet-type connections require the use of four to six connector pins on the screen 32, with power requiring two connector pins for 12V DC power. The screen 32 can be configured to turn on and start up the necessary programs automatically when the screen 32 receives power through the cable 28.

A diver can remove the display unit 26 from the skid 12, extending its cable 28 as necessary, and interact with and operate the display unit 26 while it is hand-held. The diver can then return the display unit 26 to the stowage space 24 of the skid 12 after use. Alternatively, a diver can interact with and operate the display unit 26 while it remains supported by the skid 12. For example, the display unit 26 can have a pivotable mounting to the skid 12 so that its viewing angle can be adjusted.

As a less-preferred alternative, it would be possible to send down the display unit 26 from the surface in a diver basket and for a diver to plug the cable of the display unit 26 into the skid 12 of the ROV 10 when required.

Figure 5:
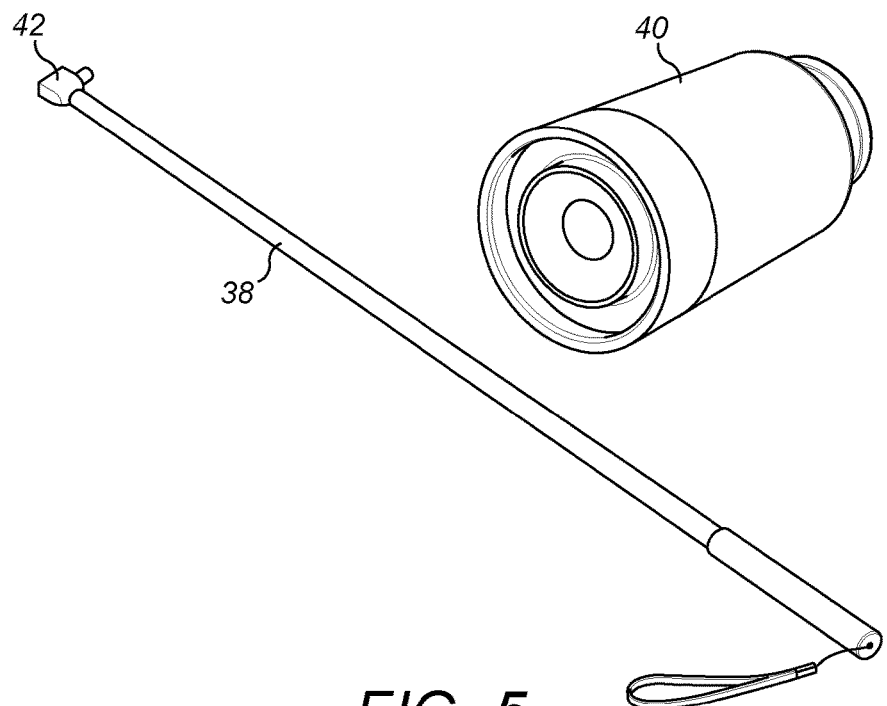
FIG. 5 is a perspective view of a video camera that can supply a video feed via the observation ROV shown in FIGS. 1 and 2, an extension pole for holding that camera also being shown, to smaller scale, in FIG. 5.

With reference now to FIG. 5 of the drawings, a camera 40 is another example of equipment that can either be carried on the skid 12 to a subsea worksite, or plugged into the skid 12 by a diver underwater after being lowered separately to the worksite in a diver basket. The example of a camera 40 shown here is offered by Tritech International Limited under the trade mark Super SeaSpy. This is a compact, high resolution, full colour underwater video camera with integral low-voltage lighting, which requires a 24V DC power supply.

An extension pole 38 is also shown in FIG. 5, to smaller scale. This is a conventional, inexpensive, lightweight telescopic pole for underwater cameras, with a simple clamp 42 at one end for holding the camera 40.

Again, a diver can carry the camera 40 and the extension pole 38 away from the skid 12, extending a connecting cable from the skid 12 to the camera 40 as necessary, and interact with and operate the camera 40 while it is held in one hand. The diver can then return the camera 40 to the skid 12 after use, or unplug the cable of the camera 40 from the skid 12 and return the camera 40 to the surface in a diver work basket.

The camera 40 and the extension pole 38 can be used instead of, or as a supplement to, a diver helmet camera. Preferably, the diver helmet cameras are retained for safety and the camera 40 and the extension pole 38 are used in addition. As there is then no need for a diver to remove a diver helmet camera to access difficult-to-reach places—this being an operation would require the diver to return to the diving bell—very substantial savings of time and hence cost can be achieved. It is estimated that circa US$5000 can be saved on each inspection.

Image signals from the camera 40 are routed through the skid 12 to the ROV 10 and via the umbilical 16 to monitors in dive control on the surface support vessel. Those image signals add to the imaging options from other cameras at the worksite, including the two cameras that are typically mounted on the ROV 10. All such images can be overlaid on monitors, including the screen 32 of the display unit 26, can be recorded and can be seen by a surface support team in dive control.

Figure 6:
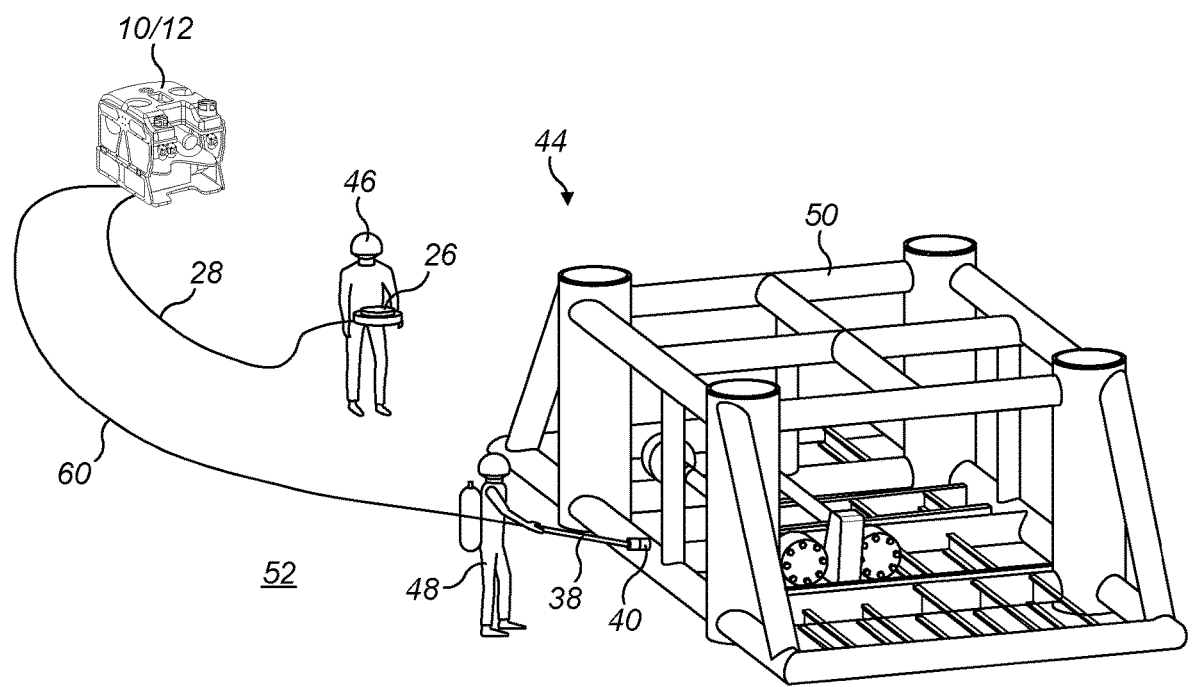
FIG. 6 is a perspective view showing two saturation divers working at a subsea worksite with the support of the ROV shown in FIGS. 1 and 2, a first diver using the display unit shown in FIG. 4 and a second diver using the camera and extension pole shown in FIG. 5.

To exemplify how an ROV 10 of the invention can support divers underwater, FIG. 6 shows a subsea worksite 44 at which two divers 46, 48 are together performing an inspection task on a subsea structure 50 that lies on the seabed 52. Typically the divers 46, 48 will have been lowered to the worksite in a diving bell 54, which is not shown in FIG. 6 but is shown in the system block diagram of FIG. 7.

Figure 7:
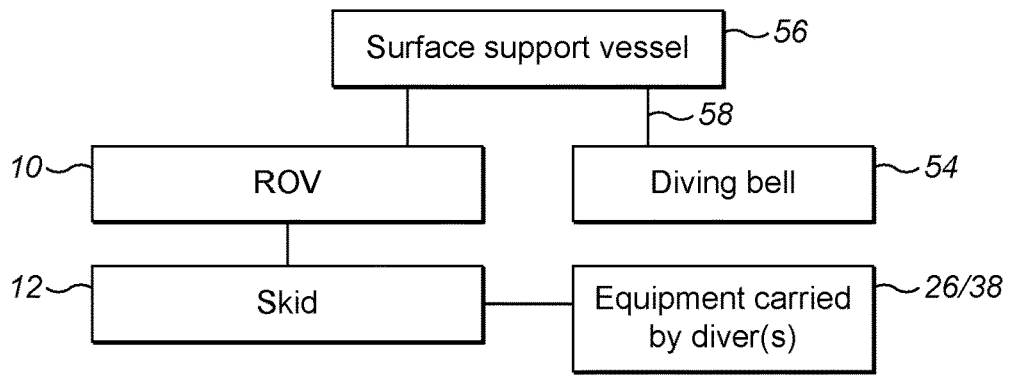
FIG. 7 is a system diagram showing the interaction between a surface support vessel, the ROV and skid shown in FIGS. 1 and 2 and equipment used by saturation divers, who are transported to the worksite in a diving bell that is also supported by the vessel.

The divers 46, 48 may remain connected to the diving bell 54, or directly to a surface support vessel 56 also shown in FIG. 7, by umbilicals (not shown in FIG. 7) that provide for life support and for audio communication with dive control on the surface support vessel 56. Wireless audio communication between the divers 46, 48 and the diving bell 54 is also possible, audio signals then being conveyed between the diving bell 54 and the surface support vessel 56 via the separate umbilical 58 that is also shown schematically in FIG. 7.

The divers 46, 48 are shown in FIG. 6 supported by an ROV 10, which has flown to the worksite 44 and has landed on the seabed 52 or is floating nearby with neutral buoyancy. The thrusters of the ROV 10 may be turned off for safety when the divers 46, 48 are close to the ROV 10. To enhance safety, cameras on the ROV 10 may monitor the divers 46, 48 while they complete their task.

A first diver 46 is shown viewing, and holding in his hand, a display unit 26 that was carried to the worksite 44 on the skid 12 of the ROV 10. The display unit 26 is connected to the skid 12 by an extended power and data cable 28.

A second diver 48 is shown operating, and holding in his hand, a camera 38 supported by an extension pole 38 to inspect the subsea structure 50. The extension pole 38 enables the second diver 48 to point the camera 40 into difficult-to-reach places on the subsea structure 50. The camera 38 is connected to the skid 12 by another extended power and data cable 60, which carries image data back to the skid 12 to be conveyed along the umbilical 16 of the ROV 10 to a surface support team in dive control.

When required, the skid 12 may convey to the display unit 26 image data captured by the camera 40 held by the second diver 48, so that the first diver 46 holding the display unit 26 can view the images captured by the camera 40. The first diver 46 can then liaise with the second diver 48, most conveniently by verbal communication. For example, the first diver 46 may ask the second diver 48 to hold the camera 40 pointing at something of interest on the subsea structure 50 or to move the camera 40 to view another part of the subsea structure 50. The first diver 46 may also convey instructions or other relevant information to the second diver 48 by reading that information from the screen 32 of the display unit 26, either as text or as graphics.

In principle, it would be possible for a single diver 46, 48 to hold the display unit 26 and also to hold the camera 40 via the extension pole 38, so as to guide and operate the camera 40 with the benefit of direct visual feedback through the display unit 26.

Figure 8:
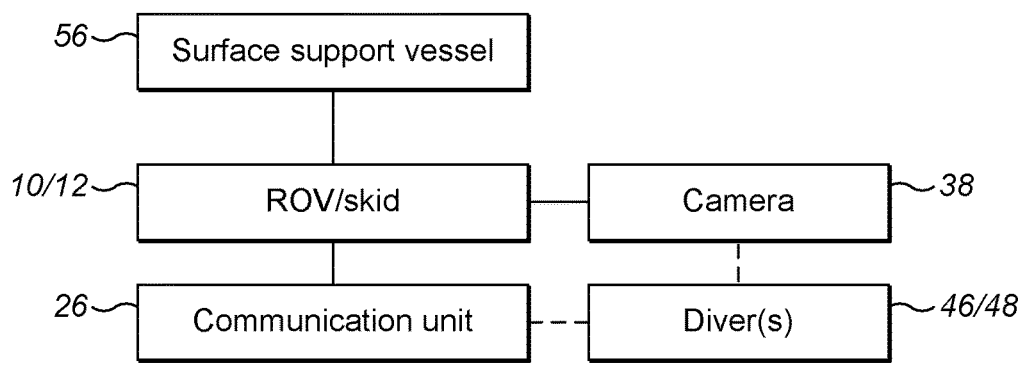
FIG. 8 is a diagram showing how video signals and images are handled in a system of the invention.

FIG. 8 is a block diagram representing the aforementioned video connections, showing one or more divers 46, 48 interacting with the display unit 26 and with the camera 40 that are both connected to the ROV 10 via the skid 12.

Like the display unit 26, a diver 46, 48 could interact with and operate the camera 40 while it remains supported by the skid 12. It would also be possible for dive control aboard the surface support vessel 56 to interact with and operate the camera 40. In that case, the camera 40 could be mounted to the skid 12 on a remotely-operable mounting that controls the orientation of the camera 40 relative to the skid 12.

Figure 9:
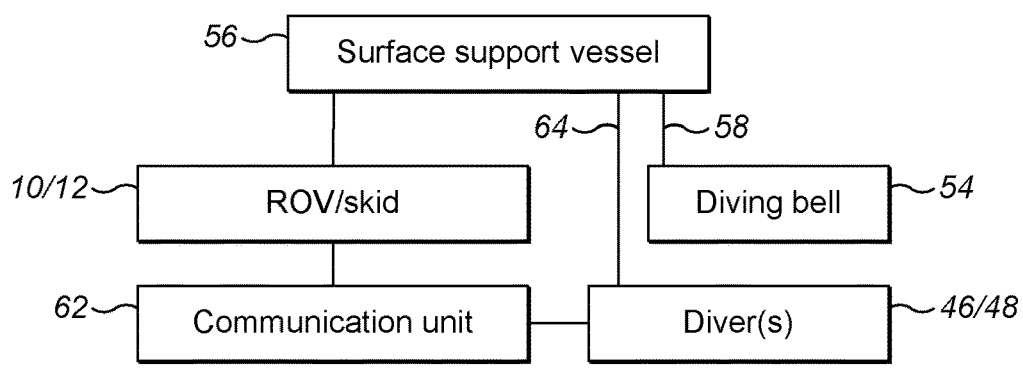
FIG. 9 is a diagram showing how audio signals are handled in a system of the invention.

To provide additional redundancy for transferring audio signals between one or more divers 46, 48 and the surface support vessel 56, the ROV 10 or the skid 12 may support an emitter-receiver communication unit 62 that communicates wirelessly with the divers' helmets. Such a unit 62 may operate like the audio communication system that acts between the divers 46, 48 and the diving bell 54. In this respect, reference is made to the block diagram of FIG. 9, which represents various possible audio connections between the divers 46, 48 and the surface. Those audio connections comprise connections via the ROV 10 or skid 12 and via the diving bell 54, in addition to the option of direct audio connection between the divers 46, 48 and the surface support vessel 56 through umbilicals 64.

Figure 10:
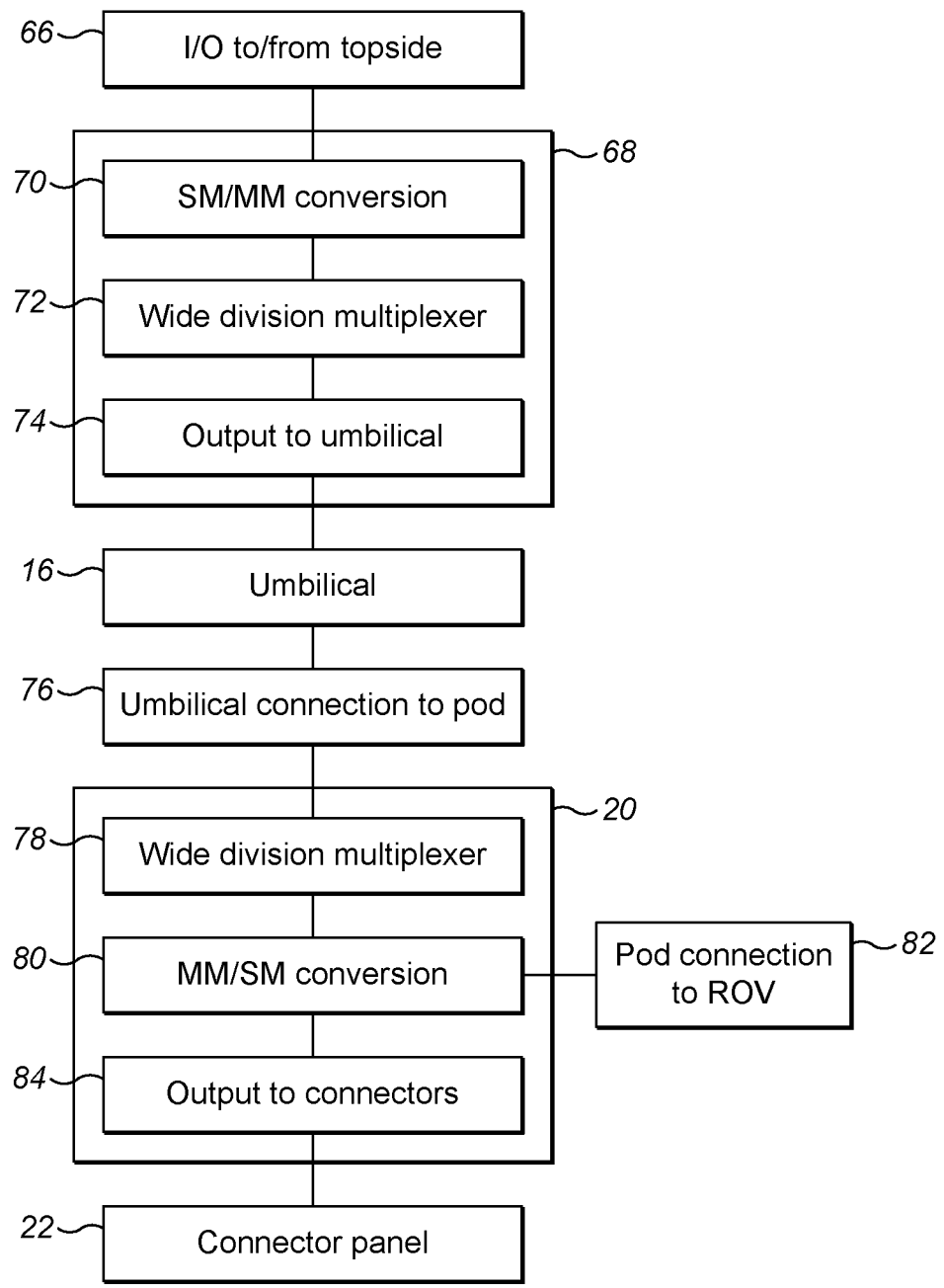
FIG. 10 is an electronic communications requirement flowchart of a system in accordance with the invention.

FIG. 10 is an electronic communications requirement flowchart for implementing the invention. An input/output interface 66 to/from topside reflects that each surface support vessel 56 may have a slightly different topside communications setup. The input/output from and to the ROV 10 needs to be taken to and from the correct topside equipment.

Most ROV 10s have a multi-mode (MM) fibre in the umbilical 16 that links them to a surface support vessel 56. To allow parallel sending of optical signals down the umbilical, topside electronics 68 convert single-mode (SM) signals into a multi-mode signal at 70. The topside electronics 68 further comprise a wide division multiplexer or WDM 72. Thus processed, signals are output at 74 to the umbilical 16 that leads to the ROV 10.

The topside electronics 68 thus convert single-mode signals from topside equipment to be output as multiplexed multi-mode optical signals that are sent to the ROV 10 through a fibre-optic connection in the umbilical 16. The multiplexed optical signals comprise ROV control signals and signals that are to be conveyed to equipment communicating with the skid 12, such as the display unit 26.

The signal from the umbilical 16 is first sent through a connection 76 to the pod 20 of the skid 12. Here, the signal is de-multiplexed using another WDM 78. Other electronics in the pod 20 convert the multi-mode signal back to a single-mode signal at 80 and send the control signal element to the ROV 10 through a connection 82 between the pod 20 and the ROV 10. The single-mode signal is also output from the pod 20 at 84 and supplied by internal cables to the connectors 22, via which the skid 12 can communicate with equipment such as the display unit 26 and the camera 40 as noted above.

Data communication to the surface support vessel 56 from equipment such as a camera 40 wet-mated to the connectors 22 reverses the above process, with single-mode to multi-mode conversion and multiplexing in the pod 20 followed by multi-mode to single-mode conversion and de-multiplexing in the topside electronics 68.

Figure 11:
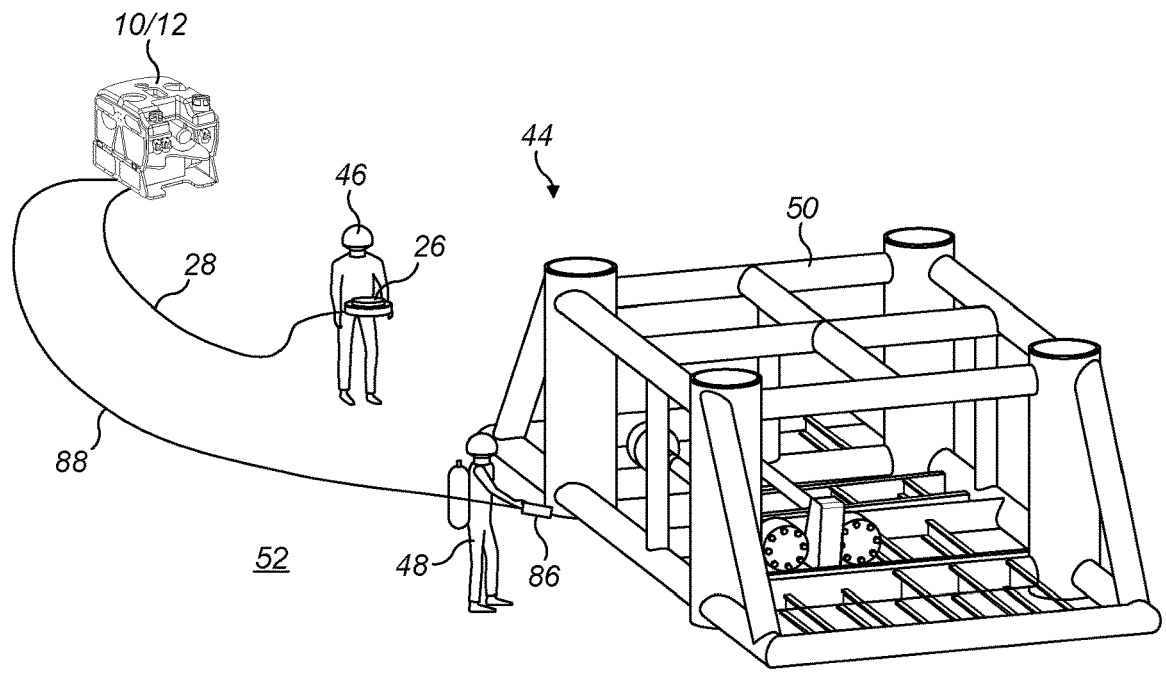
FIG. 11 is a perspective view corresponding to FIG. 6 but showing the second diver using a subsea tool connected to, and powered electrically from, the ROV and skid shown in FIGS. 1 and 2.

The ROV 10 and skid 12 of the invention may also provide electrical power to drive wet-mateable power tools 86 underwater. In this respect, FIG. 11 shows the subsea worksite 44 at which two divers 46, 48 are now together performing an intervention task on the subsea structure 50 that lies on the seabed 52. Again, an ROV 10 fitted with a skid 12 of the invention has flown to the worksite 44 to support the divers 46, 48.

As in FIG. 6, a first diver 46 is shown viewing, and holding in his hand, a display unit 26 that was carried to the worksite 44 on the skid 12 of the ROV 10. The display unit 26 is again connected to the skid 12 by the extended power and data cable 28. However, in this case, the second diver 46 is shown holding an electrically-powered hand tool 86 that is wet-mated to one of the array of connectors 22 on the skid 12 via a power cable 88 extended across the seabed 52.

As before, the first diver 46 can liaise with the second diver 48, most conveniently by verbal communication using audio systems described above. For example, the first diver 46 may convey instructions for using the hand tool 86 to the second diver 48 by reading those instructions from the screen 32 of the display unit 26.

The electrically-powered hand tool 86 operated by the second diver 48 may be chosen from among the following non-exhaustive list: a grinder; a drill; a vibrating scraper; a modular rotary tool with interchangeable heads or fittings; a saw; an ultrasonic or cathodic protection testing meter; or a torque tool.

Subsea tools 86 or other equipment powered in accordance with the invention need not only be hand-held. In principle, larger items of equipment could be powered electrically by the ROV 10 through the skid 12, such as a pressure pumping spread used for cleaning, a testing spread or a small hydraulic power unit. This allows standalone subsea equipment to be powered locally from a mobile underwater source rather than needing downlines from the surface as are relied upon in the prior art.

Currently, battery-powered hand tools are not practical for use at the depths experienced by saturation divers. This is mainly due to the difficulties of making effective underwater batteries that are small enough. So, using electrical power supplied via the ROV of the invention instead makes electrical hand tools for divers possible. Using such tools will enable many time savings. For example:

using an electric grinder with a cleaning head or an electric scraper to clean a variety of subsea objects, rather than using a wire brush or a manual scraper;

using a rotary tool such as an electric drill to run nuts up studs rather than by hand;

using a modular rotary tool with interchangeable heads to clean various different difficult-to-reach areas; or using an electric torque tool with a turns counter as opposed to using a torque wrench.

Figure 12:
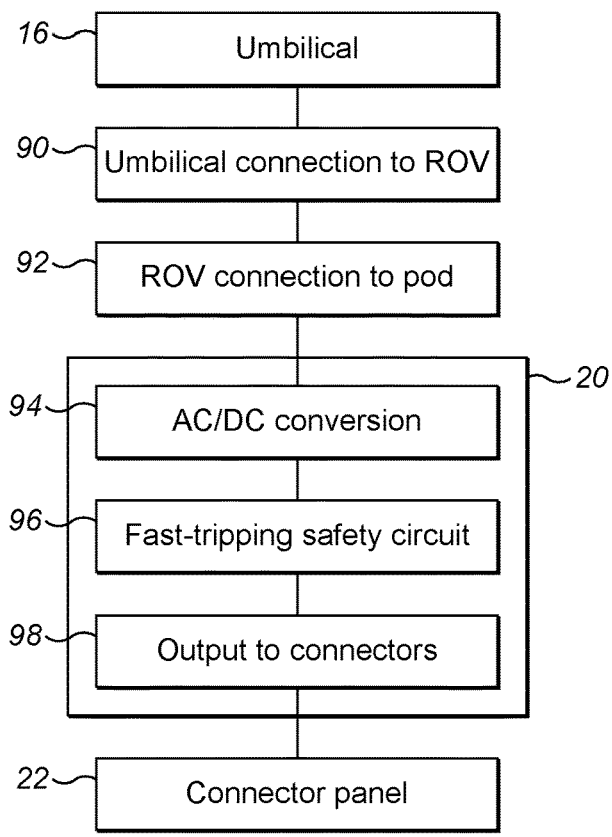
FIG. 12 is an electrical power requirement flowchart of a system in accordance with the invention.

FIG. 12 is an electrical power requirement flowchart for implementing the invention. Here, power supplied through the umbilical 16 is first supplied to the ROV 10 through an umbilical-to-ROV connection 90 and then from the ROV 10 to the pod 20 of the skid 12 through an ROV-to-skid connection 92. In the pod 20, an optional AC/DC conversion circuit 94 converts the electrical power from the umbilical 16 from AC to DC, which is supplied through a fast-tripping safety circuit 96 to an output 98 that supplies DC power through internal cables to the connectors 22 on the skid 12.

In a seawater environment, the safety circuit 96 is important to protect divers 46, 48 using power tools 86 wet-mated to the connectors 22. That circuit 96 must trip and protect the divers 46, 48 within a very short period of time in the event of a fault. The skid 12 may, for example, provide electrical power to a hand tool 86 at voltages of up to 250V DC or 220V AC if the tool 86 is connected to a safety circuit 96 that will trip in no more than 20 ms. It is particularly advantageous to provide such a safety circuit 96 in the context of power tool usage due to the amount of electrical power and the associated high voltages that are required to power such tools. By comparison, a display unit 26 is operable (or may be charged) at lower power levels and lower voltages for which divers will require less robust protection.

As a further safety precaution, cables 28, 60, 88 connecting the display unit 26, camera 40 or hand tools 86 to the skid 12 of the ROV 10 may be tied off to a fixed subsea structure 50. This is in case the ROV 10 drifts or malfunctions and so pulls on the cables 28, 60, 88.

Moving on now to FIGS. 13 to 18 of the drawings, these show a selection of other display modes of the screen 32 in the display unit 26 first shown in FIG. 4. While swapping between these modes, the screen 32 may continue to display an information bar 100 comprising basic information such as depth, water temperature, compass heading, time and date.

Figure 13:
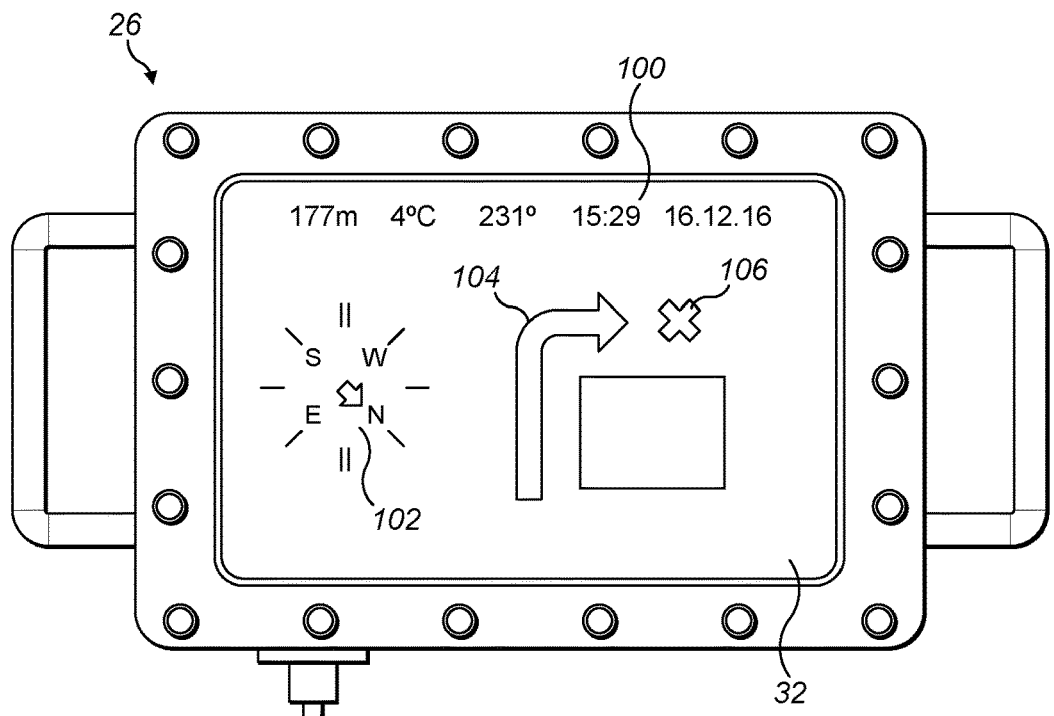
FIG. 13 is a schematic front view of the display unit of FIG. 4, the screen of the display unit being in a second display mode.
Figure 14:
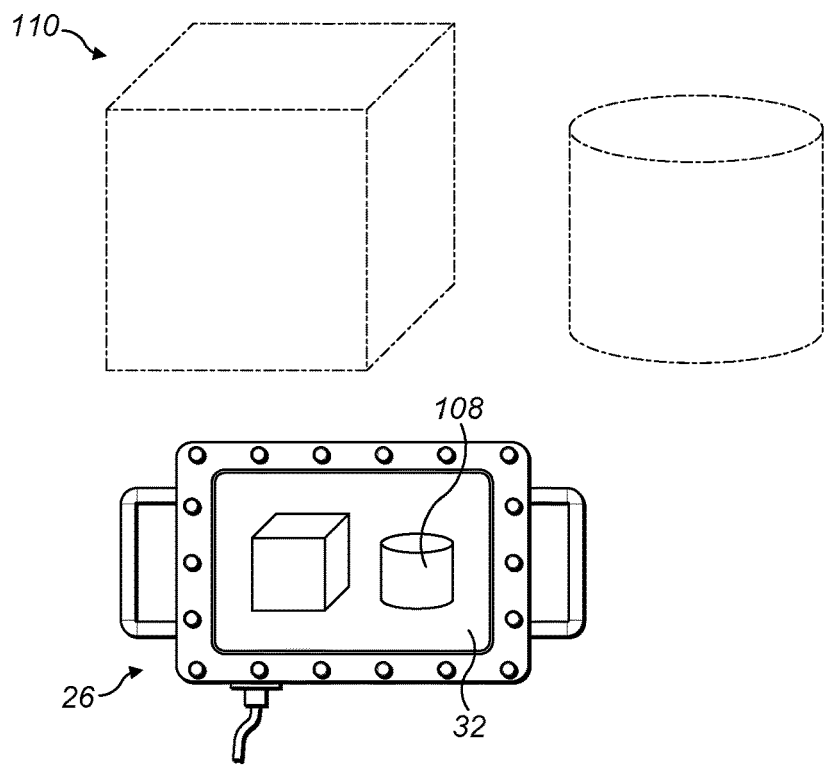
FIG. 14 is a schematic front view of the display unit of FIG. 4, the screen of the display unit being in a third display mode.

FIG. 13 shows the screen 32 displaying navigation information including a compass 102 and indicia 104 representing the direction in which a diver should travel to reach a destination 106 at a subsea worksite. In FIG. 14, the screen 32 also helps navigation and orientation but in this case by showing a clearer, enhanced image 108 of subsea structures 110 that are obscured to normal view by poor subsea visibility. The enhanced image 108 may, for example, be constructed from sonar signals, by image processing, from historic imagery of the subsea structures 110 or from a virtual digital model of the subsea structures 110.

Figure 15:
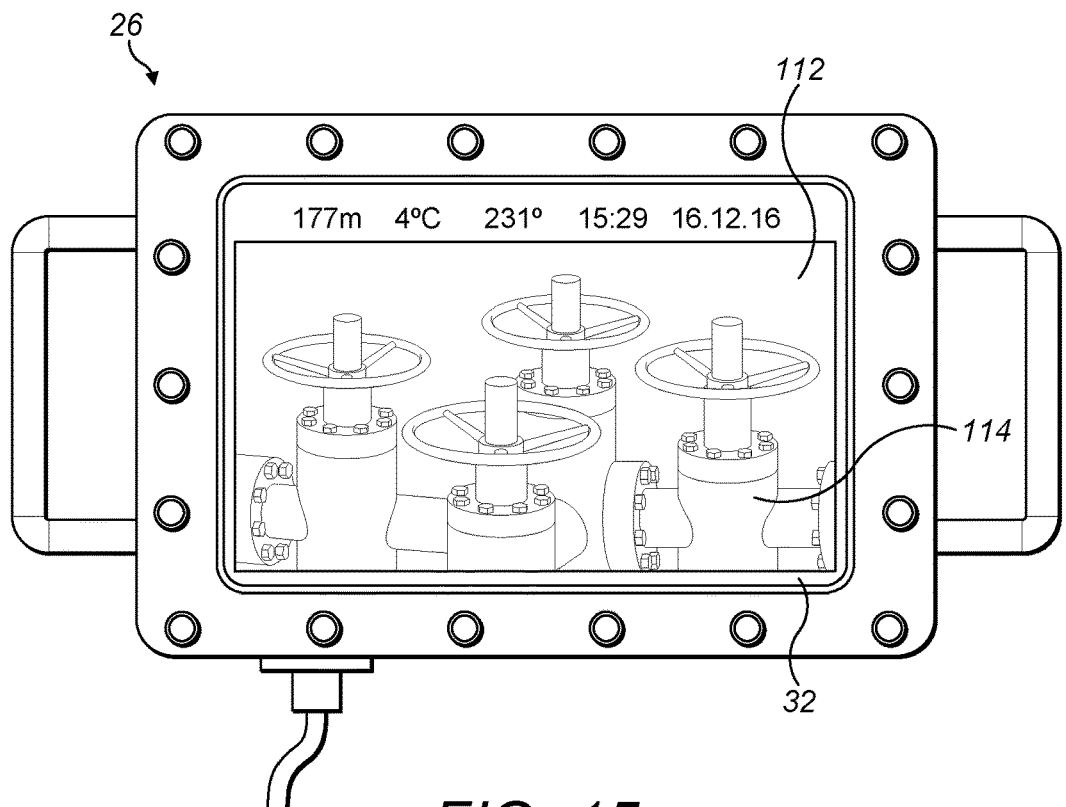
FIG. 15 is a schematic front view of the display unit of FIG. 4, the screen of the display unit being in a fourth display mode.
Figure 16:
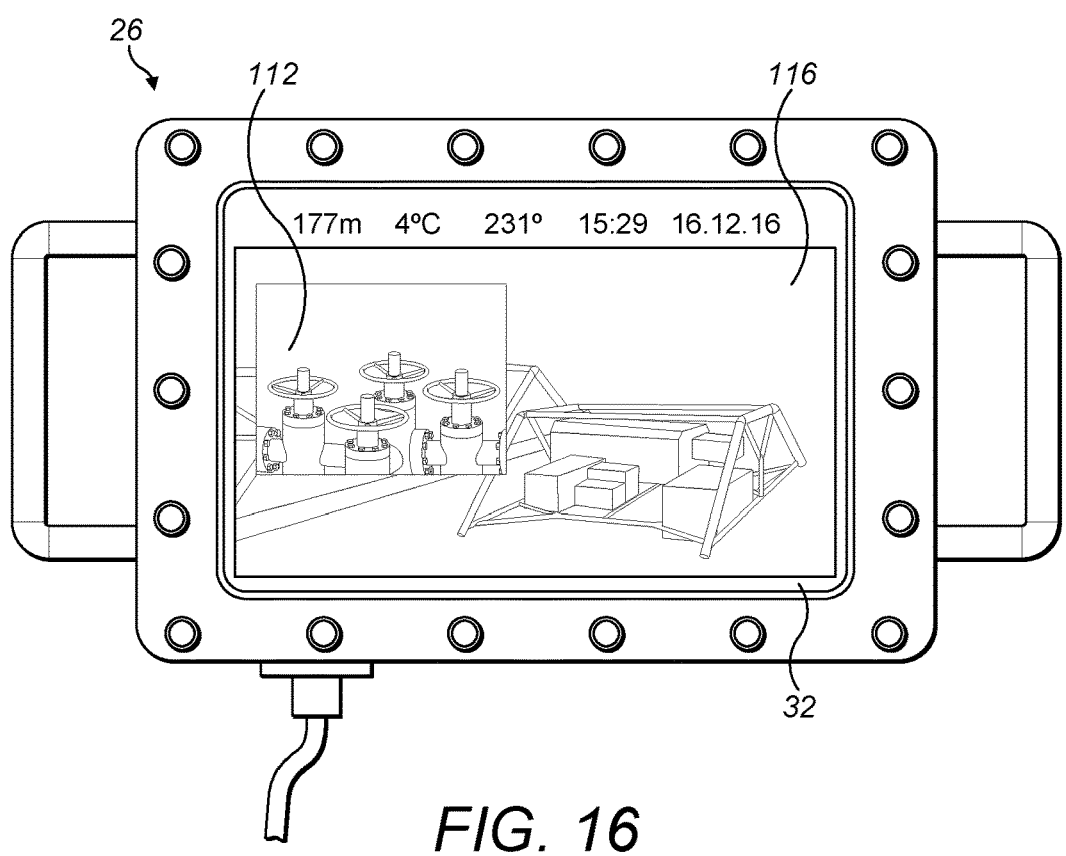
FIG. 16 is a schematic front view of the display unit of FIG. 4, the screen of the display unit being in a fifth display mode.
Figure 17:
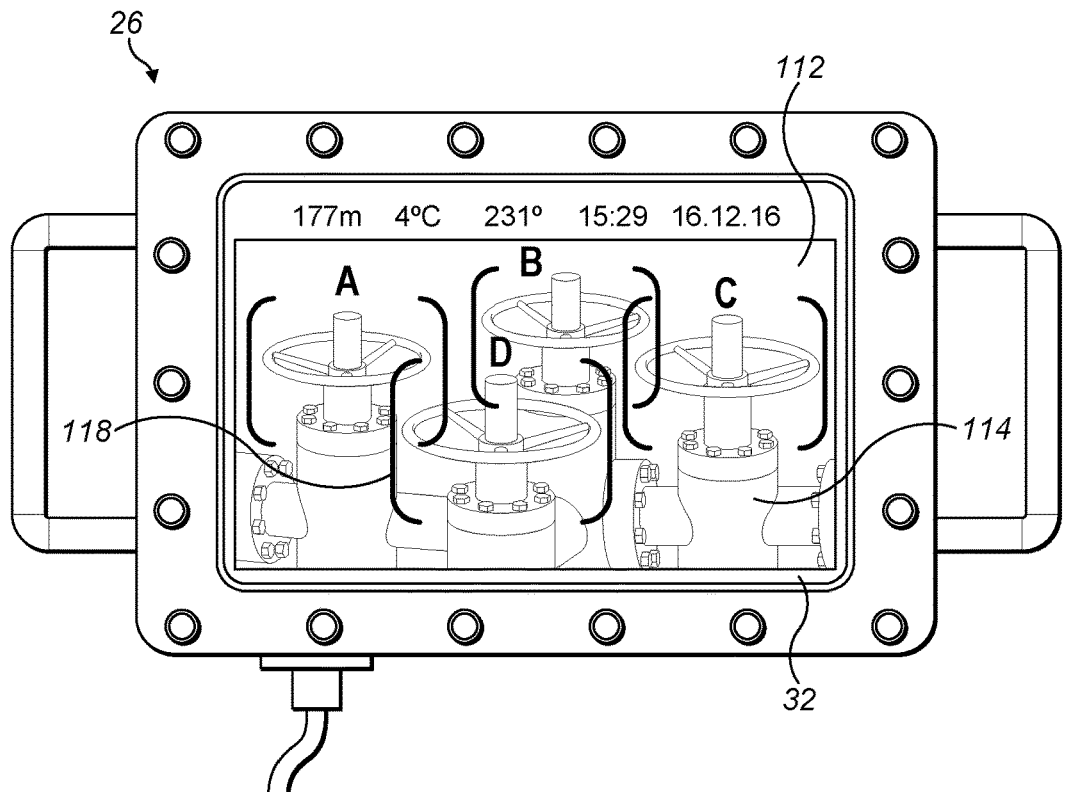
FIG. 17 is a schematic front view of the display unit of FIG. 4, the screen of the display unit being in a sixth display mode.

In FIG. 15, the screen 32 shows a close-up image 112 captured by a hand-held camera 40, in this example a picture of an array of subsea valves 114. FIG. 16 superimposes or insets that image 112 onto a wider image 116 of the related subsea installation, as may be captured simultaneously by a camera on the ROV 10.

Subsea valve identification is a good example of how the invention can save valuable time during a subsea operation. Sometimes when there are several valves 114 in a subsea structure, it can be difficult for a diver to locate and identify a particular valve 114 due to the age of the structure and a covering of marine growth. Showing images of the valves 114 on the screen 32, either as new or from a recent survey, can help a diver to locate the correct valve 114 and so save time and avoid mistakes.

Figure 18:
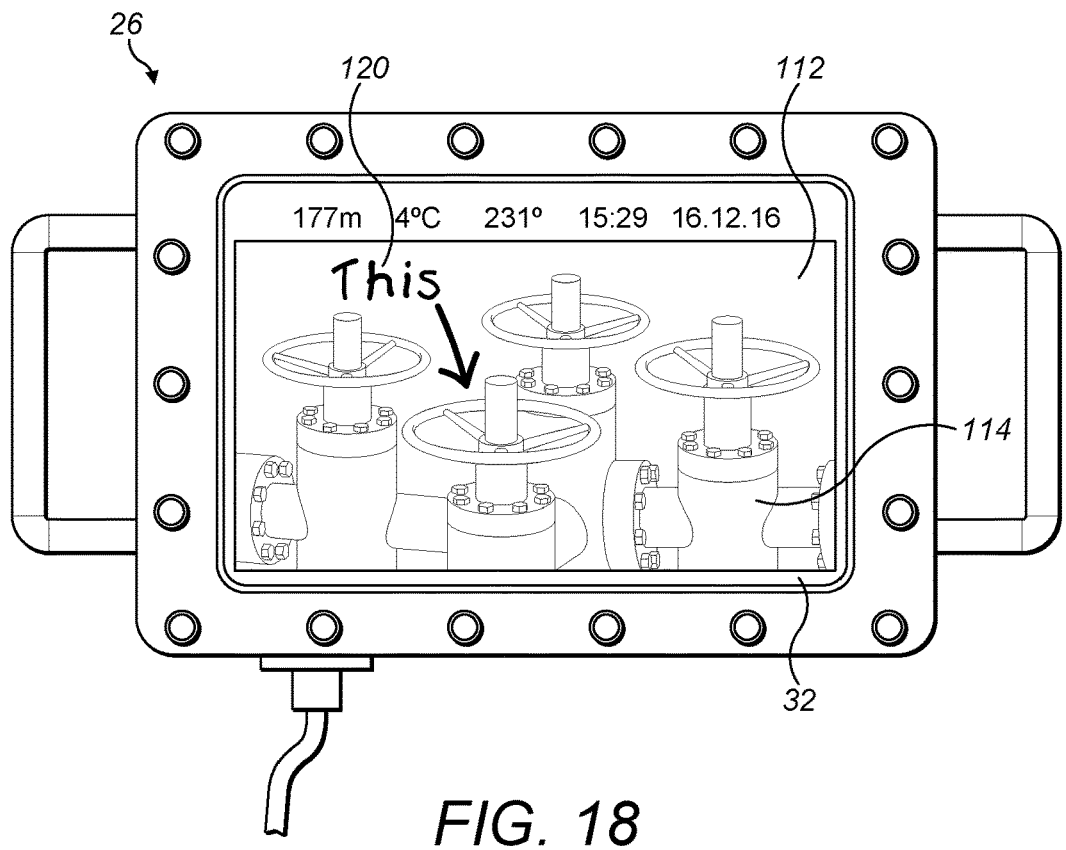
FIG. 18 is a schematic front view of the display unit of FIG. 4, the screen of the display unit being in a seventh display mode.

Another way to guide a diver to the correct valve 114 is to mark the valves 114 on the image 112 shown on the screen 32. Thus, in FIG. 17, the screen 32 shows the same close-up image 112 as in FIG. 15 but modified to present augmented reality with an overlay of icons 118 that identify the respective valves 114 in that image 112. For example, a diver presented with this augmented-reality image 112 can be instructed verbally by dive control to "close valve D". FIG. 18 shows another way in which dive control can identify a specific valve 114 in the image 112, in this example by live-sketching words and/or symbols 120 onto the image 112 to guide a diver viewing the screen 32 to close the appropriate valve 114.

Figure 19:
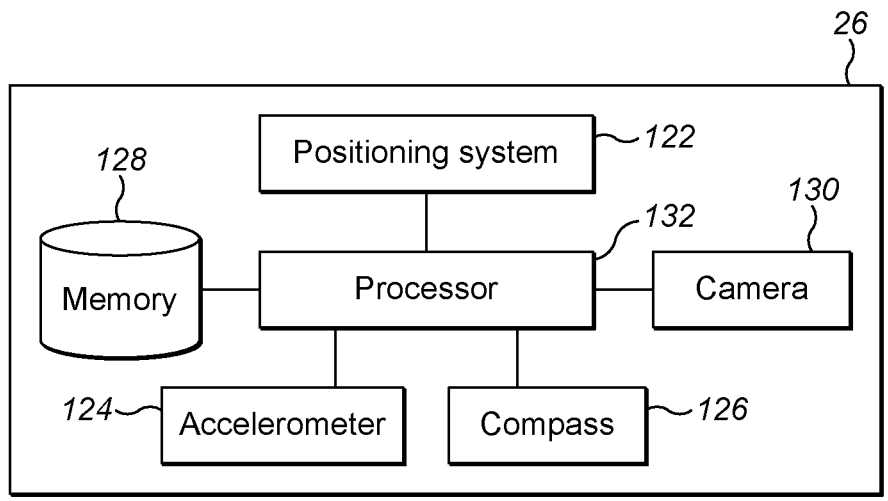
FIG. 19 is a system block diagram of a display unit in accordance with the invention.

FIG. 19 of the drawings shows that the display unit 26 may be equipped with an appropriate selection of the following features to support the above functionality:

a locating element of a positioning system 122, for example one responsive to subsea acoustic beacons by triangulation or a system that determines the position of the display unit 26 relative to a known position of the ROV 10;

an accelerometer system 124 to determine motion and absolute orientation of the display unit 26 in three dimensions;

a magnetic compass 126 to determine the heading and orientation of the display unit 26 relative to its seabed surroundings;

a memory 128 programmed with textual and 3D visual information regarding the worksite and equipment at that worksite; and/or a camera 130 as a further visual cross-check of the immediate surroundings of the display unit 26.

FIG. 19 shows the above features interacting with a processor 132 running appropriate programs, which processor 132 may conveniently be integrated with the screen 32 on board the display unit 26. However, processing may take place elsewhere and the memory 128 can also be implemented elsewhere, for example in the skid 12, in the ROV 10 or onboard the surface support vessel 56.

Figure 20:
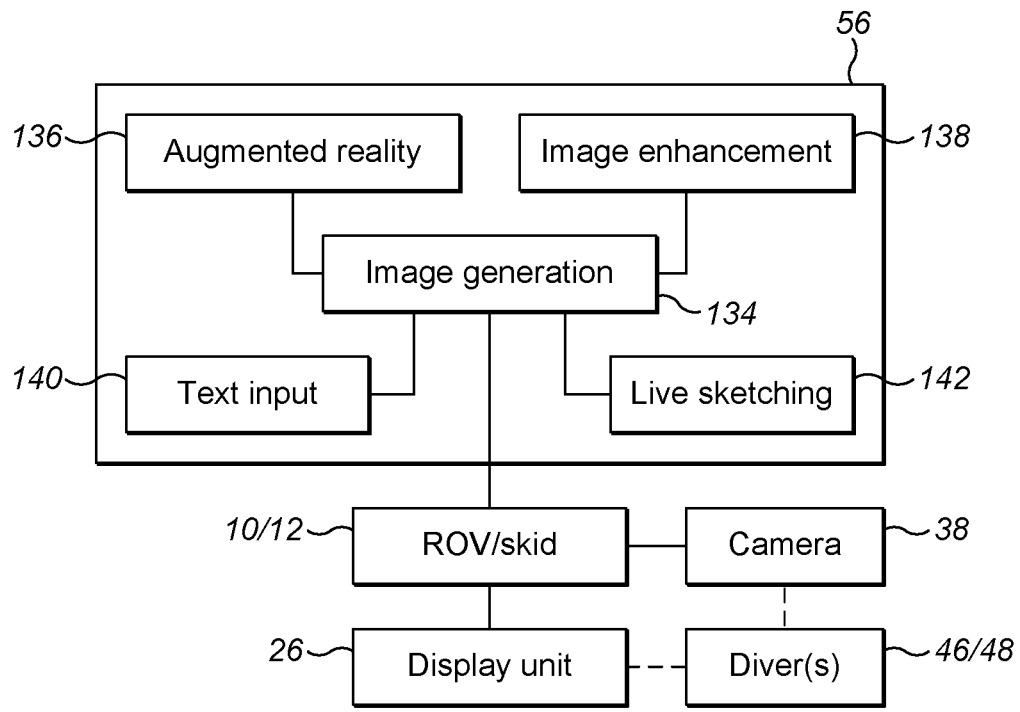
FIG. 20 is a diagram showing how the display modes shown in FIGS. 4 and 13 to 18 may be generated.

Turning finally to FIG. 20, this shows how the various display modes of the screen 32 shown in FIGS. 4 and 13 to 18 may be generated in a system of the invention. Here, computer systems on the surface support vessel 56 implement an image generation engine 134, which generates images that are sent to the ROV 10 via the umbilical 16 and from there via the skid 12 to the screen 32 of the display unit 26.

In this example, the image generation engine 134 takes inputs as necessary from: an augmented reality engine 136; an image enhancement engine 138; a text input device 140 such as a keyboard; and a live sketching engine 142. The image generation engine 134 may also receive image data from the camera 40 via the skid 12, the ROV 10 and the umbilical 16.

In principle, the functionality of the image generation engine 134 could be distributed between various sub-systems at different locations. The text input device 140 and the live sketching engine 142 are operated by a surface support team in dive control aboard the surface support vessel 56. However, the augmented reality engine 136 and the image enhancement engine 138 could be implemented elsewhere, for example aboard the ROV 10, the skid 12 or the display unit 26.

The invention claimed is:

1. A subsea assistance system for saturation divers, the system comprising:
 a UUV;
 items of ancillary electrical equipment that are connected or subsea-connectable to the UUV, those items comprising:
  at least one hand-portable subsea tablet arranged to display to a diver, subsea, an image corresponding to image data communicated to a display of the tablet from the UUV, wherein the tablet is diver-transportable away from the UUV to a subsea location remote from the UUV while remaining connected to the UUV by a display data link implemented by a first cable extendable from the UUV, which cable also conveys electrical power to the tablet;
  and
  at least one subsea camera arranged to capture image data, subsea, for communication to the UUV, wherein the camera is diver-transportable away from the UUV and from the tablet to a subsea location remote from the UUV while remaining connected to the UUV via a camera data link implemented by a second cable extendable from the UUV, which cable also conveys electrical power to the camera;
  and/or
  at least one subsea electrical tool that is connected or connectable to at least one wet-mateable electrical connector of the UUV via a third cable for conveying electrical power to the tool, wherein the tool is diver-transportable away from the UUV and from the tablet to a subsea location remote from the UUV while remaining connected to the UUV via the third cable;
 wherein the UUV comprises a communication device arranged to convey, via audio communication, instructions for using the camera and/or the tool from a diver holding the tablet to another diver holding the camera and/or the tool.

2. The system of claim 1, wherein the tablet comprises a locating device that is capable of determining a subsea location of the tablet.

3. The system of claim 2, further comprising a navigation system that is responsive to the location of the tablet and that is arranged to display corresponding navigation information on the tablet.

4. The system of claim 2, further comprising a memory storing data that characterizes a subsea worksite, wherein the system is arranged to retrieve stored image data from the memory corresponding to the location and a subsea heading of the tablet when in the worksite and to display on the tablet an image corresponding to that stored image data.

5. The system of claim 1, further comprising:
 an augmented reality engine for overlaying augmented reality images onto an image displayed on the display; and/or
 a live sketch engine for overlaying live sketch images onto an image displayed on the display; and/or
 an image enhancement engine for enhancing image data captured by the camera before displaying a corresponding image on the display.

6. The system of claim 1, wherein the UUV is arranged to process data signals incoming from surface support and to separate those signals into UUV control signals and data signals for transmission to the ancillary equipment.

7. The system of claim 1, wherein the UUV has a data link to surface support and is arranged to convey to the display image data communicated along the data link from the surface support.

8. The system of claim 1, wherein at least one connector is protected by a protective device that is arranged to trip a circuit breaker in 20 ms or less.

9. The system of claim 8, wherein the or each connector protected by the protective device is supplied by a power circuit capable of operating at a voltage of up to 250V DC or 220V AC.

10. The system of claim 1, wherein the UUV comprises a skid to which at least one of said items of ancillary equipment is connected or is subsea-connectable.

11. The system of claim 1, wherein the UUV comprises at least one onboard stowage space for at least one of said items of ancillary equipment.

12. The system of claim 1, further comprising a bidirectional diver-to-surface audio communication system routed through the UUV.

13. A method of supporting saturation diver operations, the method comprising:
 flying a UUV to a subsea worksite, the UUV carrying at least one subsea display to the worksite;
 carrying, by a first diver, the subsea display away from the UUV to a subsea location remote from the UUV while the subsea display maintains image data communication with the UUV;
 communicating image data from the UUV to the first diver at the worksite who views the subsea display that is connected to the UUV by a data link;
 the method further comprising:
 capturing, by a second diver, image data at the worksite using a camera at a subsea location remote from the UUV while maintaining image data communication between the camera and the UUV; and/or
 operating, by the second diver, a subsea electrical tool at a subsea location remote from the UUV while maintaining electrical connection between the electrical tool and the UUV;
 and wherein the method further comprises conveying, by the first diver, instructions for using the camera and/or electrical tool, to the second diver.

14. The method of claim 13, wherein the first diver carries and views the subsea display as a hand-portable subsea tablet.

15. The method of claim 13, further comprising displaying navigation information to the first diver on the subsea display corresponding to a subsea location of the subsea display.

16. The method of claim 13, comprising determining a subsea heading of the subsea display.

17. The method of claim 16, further comprising retrieving image data in accordance with the location and heading of the subsea display from a store of such data that characterizes the worksite, and displaying on the subsea display an image corresponding to the retrieved image data.

18. The method of claim 13, comprising determining 3D orientation or movement of the subsea display.

19. The method of claim 13, comprising:
   overlaying augmented reality images onto an image displayed on the subsea display; and/or
   overlaying live sketch images onto an image displayed on the subsea display; and/or
   enhancing the captured image data before displaying a corresponding image on the subsea display.

20. The method of claim 13, comprising integrating image data captured at the worksite with image data received from surface support.

21. The method of claim 13, comprising communicating image data from surface support to the UUV before communicating that image data from the UUV to the or each subsea display.

22. The method of claim 21, wherein the UUV processes data signals incoming from surface support and separates those signals into UUV control signals and image data signals for transmission to the or each subsea display.

23. The method of claim 13, wherein a diver connects the subsea display, the camera and/or the subsea electrical tool to the UUV when underwater via a wet-mateable electric connector.

* * * * *